United States Patent
Ashton

(10) Patent No.: US 12,151,566 B2
(45) Date of Patent: Nov. 26, 2024

(54) SYSTEM PROVIDING ADDITIONAL POWER TO EXTEND RANGES OF ELECTRIC VEHICLES

(71) Applicant: Anthony Wayne Ashton, Creola, OH (US)

(72) Inventor: Anthony Wayne Ashton, Creola, OH (US)

( * ) Notice: Subject to any disclaimer, the term of this patent is extended or adjusted under 35 U.S.C. 154(b) by 444 days.

(21) Appl. No.: 17/648,439

(22) Filed: Jan. 20, 2022

(65) Prior Publication Data

US 2022/0402373 A1 Dec. 22, 2022

Related U.S. Application Data

(60) Provisional application No. 63/211,369, filed on Jun. 16, 2021.

(51) Int. Cl.
*H02J 7/00* (2006.01)
*B60L 50/62* (2019.01)
*B60L 58/13* (2019.01)

(52) U.S. Cl.
CPC .............. *B60L 50/62* (2019.02); *B60L 58/13* (2019.02); *B60L 2240/507* (2013.01)

(58) Field of Classification Search
None
See application file for complete search history.

(56) References Cited

U.S. PATENT DOCUMENTS

| | | | |
|---|---|---|---|
| 5,296,746 A * | 3/1994 | Burkhardt | H02J 7/34 180/2.2 |
| 5,839,533 A | 11/1998 | Mikami et al. | |
| 6,184,603 B1 * | 2/2001 | Hamai | B60W 20/00 903/952 |
| 6,724,165 B2 | 4/2004 | Hughes | |
| 8,152,245 B2 | 4/2012 | Lubbers | |
| 8,532,854 B2 | 9/2013 | Tate, Jr. et al. | |
| 8,646,550 B2 | 2/2014 | Penev | |
| 8,727,938 B2 | 5/2014 | Nozaki | |
| 8,831,808 B2 | 9/2014 | Stanek et al. | |
| 9,114,794 B2 | 8/2015 | King et al. | |
| 10,677,176 B2 | 6/2020 | Shibata | |
| 10,759,430 B2 | 9/2020 | Hoffmann | |
| 10,787,089 B1 | 9/2020 | Macaluso | |
| 10,800,284 B2 | 10/2020 | He et al. | |
| 10,933,752 B2 | 3/2021 | Miller et al. | |
| 2003/0184152 A1 | 10/2003 | Cikanek et al. | |
| 2010/0274420 A1 * | 10/2010 | Veit | B63H 3/10 440/75 |
| 2012/0139486 A1 | 6/2012 | Holland | |

(Continued)

*Primary Examiner* — Arun C Williams
(74) *Attorney, Agent, or Firm* — Dunlap Bennett & Ludwig, PLLC

(57) ABSTRACT

A charging system for generating power for an electrical vehicle in motion is provided. The charging system embodies a parallel arrangement of alternators equipped with electromagnetic clutch drives disposed between a starter power source/drive assembly and electric storage device of the electrical vehicle. A charge controller controls the downstream balanced charge to the electric storage device through de-activating or activating the alternators' electromagnetic clutch drives to operate at a set RPM range. The systemic and selective control of the electromagnetic clutches addresses resistance of the alternators at higher RPMs.

1 Claim, 2 Drawing Sheets

(56) References Cited

U.S. PATENT DOCUMENTS

| | | |
|---|---|---|
| 2018/0050601 A1 | 2/2018 | Katanoda |
| 2019/0337408 A1 | 11/2019 | Xu et al. |
| 2021/0129678 A1 | 5/2021 | Barker et al. |
| 2021/0265895 A1 | 8/2021 | Grayson |

* cited by examiner

SYSTEM PROVIDING ADDITIONAL POWER TO EXTEND RANGES OF ELECTRIC VEHICLES

CROSS-REFERENCE TO RELATED APPLICATION

This application claims the benefit of priority of U.S. provisional application No. 63/211,369, U.S. provisional application number filed 16 Jun. 2021, the contents of which are herein incorporated by reference.

BACKGROUND OF THE INVENTION

The present invention relates to methods and systems for powering a vehicle and, more particularly, a system for providing additional power to an electric vehicle to extend its range.

There is a perception that an electric vehicle is advantageous over traditional fossil fuel vehicles from a "green" perspective since they derive mechanical energy from electricity supplied to an electric motor, as opposed to combusting of gas. The electricity is often drawn from an energy storage device, such as a battery, a battery array, or battery bank stored within the electric vehicle. In a typical electric motor vehicle, the energy storage device can be recharged to some extent during operation using regenerative braking; however, regenerative braking is not sufficient to fully recharge the battery, and so periodically the battery must still be connected to the external source of electricity and recharged. That process typically takes from three to six hours during which time the vehicle cannot be used for transportation. There are special charging stations which can charge a battery in thirty minutes, but these shorten the life of the battery considerably. This in turn causes hesitancy on the part of some potential buyers of electric vehicles who are turned off by electric vehicle's limited range of travel.

As can be seen, there is a need for a charging system and method for charging the energy storage device of an electric vehicle while the vehicle is being operated, thereby extending the driving range of such electric vehicle. The system of the present invention not only provides additional power that can be applied to extend electrical vehicles ranges, but also motor performance as well as still enable provide resistance braking/regenerative charging while braking.

The charging system utilizes a parasitic drive or an independent auxiliary drive motor to achieve additional charge and its related benefits. The charging system manages its operational time via software and switches to eliminate the systems resistance at higher RPMs. The systemic components work with each other to produce a controlled charge to the energy storage device, as needed, wherein the charge is managed by a charge controller and software so that an electromagnetic clutch is activated or deactivated as a function of predetermined RPM settings, thereby eliminating resistance of the charging system. This additional charge can be applied to the electric motor as well as to supplement power requirements of the vehicle.

The charging system is configured to make power under controlled applications that can be applied to the energy storage device while traveling, thereby extending the travel range. In addition, the systemic components are arranged to provide resistance that will assist in braking or slowing a vehicle. Also, the system can be connected to the actual drive motors to supply additional power which also extends the range, as well as providing systems support for improved maintenance.

There is comment that certain components have resistance at higher power output; specifically, because resistance is occurring with the charging system when it reaches a higher RPM, thereby a portion of the benefits gained are lost. However, the novel arrangement of systemic components ameliorates the high-power output resistance through a charge controller and operatively associated electromagnetic clutches to act as automatic control features. In some embodiments, a manual switch added to activate the system for charging or braking assistance.

In sum, the electric vehicles market is needing improvements to recover the maximum potential of electric vehicles products and the system embodied in the present invention (colloquially known as "the 991X System") can address the issues. The 991X System's ability and size can be as minimal or the maximum power application consisting of multiple banks of 991X System components. The 991X System operates by either parasitic or auxiliary drive options—i.e., if a power action is occurring the system will create power. Not only does the present invention offer multiple power drive options, but it can also be applied to vast amounts of vehicles, equipment, and standby power. The 991X System mounts in multiple locations and at any angel, for both battery and hydrogen power applications.

In short, the 991X System adds power to extend range availability to a wide variety of electrically powered and hydrogen powered systems to extend operational range (miles/hours) and supply additional direct power to any AC/DC motor systems required.

SUMMARY OF THE INVENTION

In one aspect of the present invention, a charging system for generating power for an electrical vehicle in motion, the charging system includes: a parallel arrangement of alternators, each equipped with an electromagnetic clutch; an electric storage device of the electrical vehicle; and a charge controller electrically coupled between the parallel arrangement of alternators and the electric storage device, wherein the charge controller selectively controls each electromagnetic clutch.

In another aspect of the present invention, the charging system further includes wherein the charge controller is configured to selectively control each electromagnetic clutch as a function of a storage capacity of the electric storage device, wherein the charge controller is configured to selectively control each electromagnetic clutch as a function of a set RPM range of the electrical vehicle, or wherein the charge controller is configured to selectively control each electromagnetic clutch as a function of a resistance of each respective alternator.

In yet another aspect of the present invention, the charging system further includes a rectifier between the parallel arrangement of alternators and the charge controller; a drive assembly operatively associated with the parallel arrangement of alternators, wherein the drive assembly comprises an auxiliary motor separate from an electric motor powering the electric vehicle, or wherein the drive assembly comprises a parasitic link to an electric motor powering the electric vehicle; and an electric motor powering the electric vehicle, wherein the electric storage device is coupled thereto.

In still yet another aspect of the present invention, the charging system further includes a parallel arrangement of alternators, each equipped with an electromagnetic clutch; an electric storage device of the electrical vehicle; and a charge controller electrically coupled between the parallel arrangement of alternators and the electric storage device, wherein the charge controller selectively controls each electromagnetic clutch, wherein the charge controller is configured to selectively control each electromagnetic clutch as a function of a group consisting essentially of a storage capacity of the electric storage device. a set RPM range of the electrical vehicle, or a resistance of each respective alternator; an external rectifier between the parallel arrangement of alternators and the charge controller; a drive assembly operatively associated with the parallel arrangement of alternators, wherein the drive assembly comprises either an auxiliary motor separate from an electric motor powering the electric vehicle or a parasitic link to an electric motor powering the electric vehicle; and an electric motor powering the electric vehicle, wherein the electric storage device is coupled thereto.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a charging system for generating power for an electrical vehicle in motion is provided. The charging system embodies a parallel arrangement of alternators equipped with electromagnetic clutch drives disposed between a starter power source/drive assembly and electric storage device of the electrical vehicle. A charge controller controls the downstream balanced charge to the electric storage device through de-activating or activating the alternators' electromagnetic clutch drives to operate at a set RPM range. The systemic and selective control of the electromagnetic clutches addresses resistance of the alternators at higher RPMs.

Figure 1:
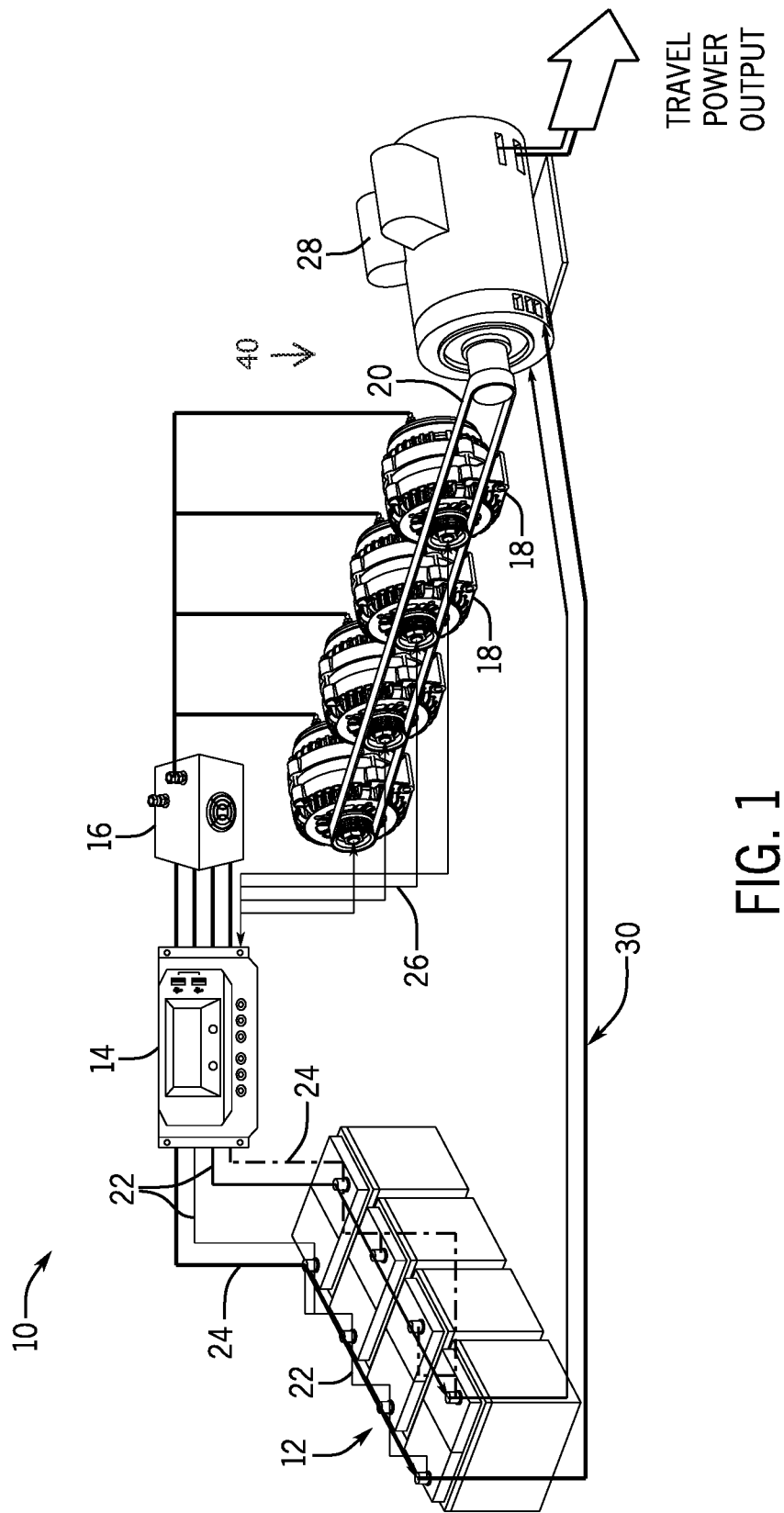
FIG. 1 is a diagrammatical perspective view of an exemplary embodiment of the present invention, including a first configuration of an electrical vehicle regeneration range extension parasitic driven system.
Figure 2:
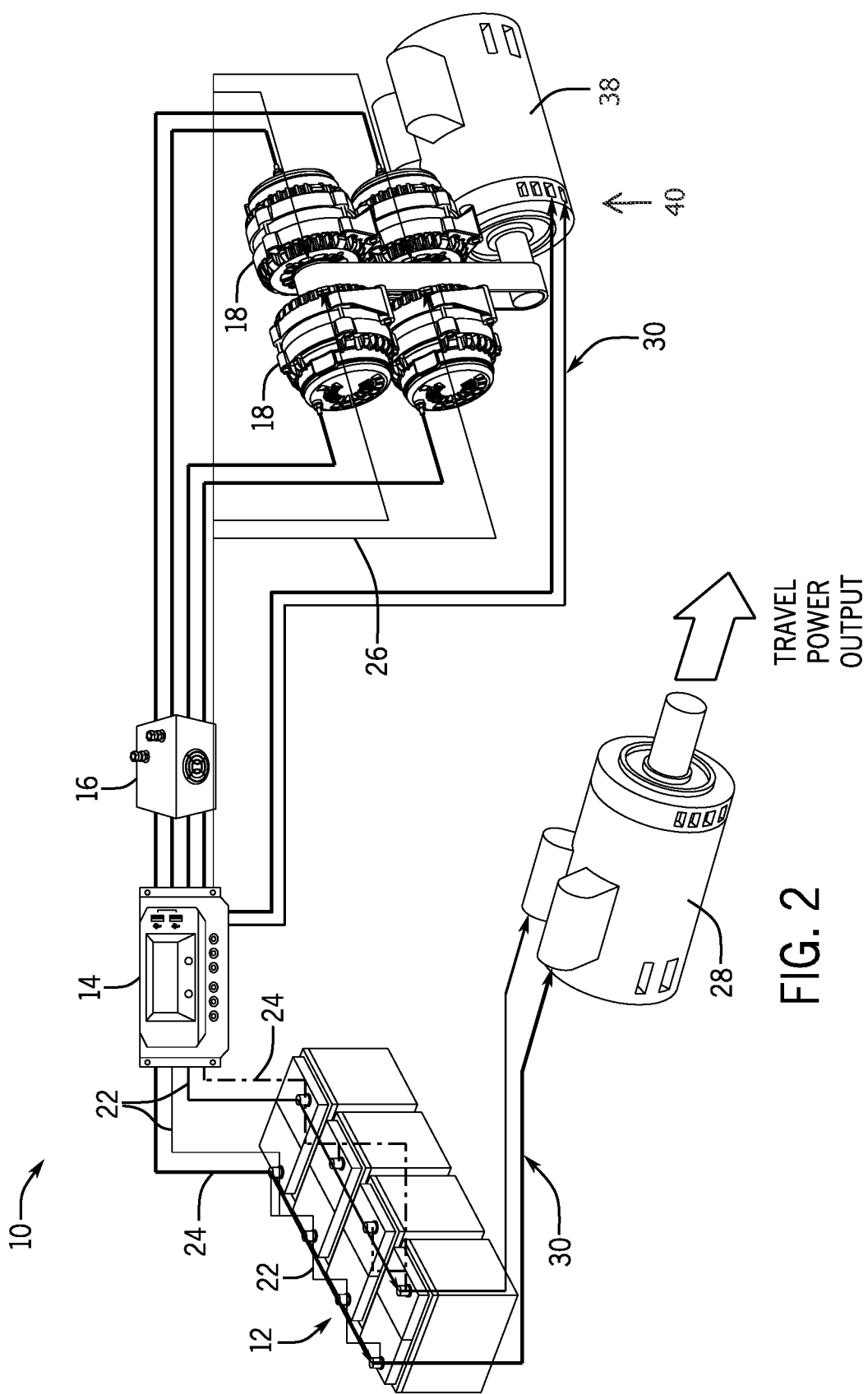
FIG. 2 is a diagrammatical perspective view of an exemplary embodiment of the present invention, including a second configuration of an electrical vehicle regeneration range extension auxiliary driven system.

Referring now to FIGS. 1 and 2, the present invention may include a charging system 10 having a drive assembly 40 electrically connected with a battery bank 12, wherein the batter bank 12 is electrically coupled, by way of power feeds 30, to an electric motor 28 for powering an electric vehicle. The drive assembly 40 may include a parasitic drive assembly or an auxiliary drive assembly having an auxiliary motor 38. The parasitic drive assembly obtains it motive power from utilizing a parasitic drive belt 20 operatively associated with the electric motor 28.

The drive assembly 40 is electrically connected to an alternator bank providing a plurality of alternators 18 operating in parallel. Each alternator 18 utilizes an electromagnetic clutch to minimize overcharging and control alternator resistance. Each electromagnetic clutch is electrically controlled by a charge controller 14 via clutch wiring 26. Each alternator 18 power output may be electrically connected to an external bridge rectifier 16 to supply continuous high-power at low engine RPM as well as manage heat away from alternator bank.

The charge controller 14 is electrically connected to the battery bank 12 by way of charge control wiring 22 and power wiring 24. The charge controller 14 manages the operation of battery charge capacity by software so as not to overcharge the batteries of the battery bank 12. In some embodiments, the charge controller 14 is configured to selectively activate the electromagnetic clutches on the alternators 18, thereby controlling the induced current that is output by the alternators 18, which in turn controls the charge outputted (via the external bridge rectifier 16) to the batteries of the battery bank 12, thereby limiting their capacity to a predetermined value. These electromagnetic clutches may also be operable via a manual switch control for the driver to utilizes for additional power requests or for electronic braking.

The charging system 10 generates power while in motion through a parallel arrangement of alternators equipped with electromagnetic clutch drives. The drive assembly begins power production via the alternator bank, which in turn directs power to the external bridge rectifier 16 to supply continuous high power at low engine RPM and manage heat away from alternator system. The charge controller 14 controls the downstream balanced charge to the battery bank 12, wherein the balancing the amps is managed by software in the charge controller 14. This same software may be programmed to control the alternators to operate at a set RPM range through de-activating or activating the alternators' electromagnetic clutch drives. This provides the on or off action to regulate the current as a function of battery reserve capacity, as well as facilitate redirection of power for motor consumption. In addition, selective control of the electromagnetic clutches addresses resistance of alternators at higher RPM. Downstream, the battery bank 12 receives the additional power and or the extra power can be applied to motor 28.

A method of manufacturing the present invention may include the following. The systemic components disclosed above may be connected to each other and then connected to the battery bank after placement in the available space. The bridge rectifiers could be left out and the drive assembly could be accomplished in another manner to satisfactorily begin power development. Alternatively, higher powered alternators could be used. The alternators can be stacked to assist in space management as well as the support the vehicles other electrical functions.

A method of using the present invention may include the following. The charging system 10 disclosed above may be provided. The charging system 10 may designed to operate with any electrical vehicle system type (AC, AC Induction, or DC motors) to extend range and available operational power.

The charging system 10 can also support existing electrical vehicles systems to allow charging while in motion. The charging system 10 was originally developed to be applied to commercial application due to their weight requiring more power to obtain a reasonable range. However, upon research and development, the inventor has found that the following application could work on any electrical vehicle be it a manufactured sedan or a commercial unit or even a retrofitted vehicle as well can benefit from the present invention, which solves range anxiety to a degree and adds additional safety through resistance braking both automatic and manually.

In short, there are many types of vehicles that could be retrofitted with the charging system of the present invention so as to work in tandem with their pre-existing system's ability to produce a re-charge while in motion. Other types of vehicles include, but are not limited to, military vehicles being retrofitted, commercial Vehicles being retrofitted, as well as heavy equipment applications.

As used in this application, the term "about" or "approximately" refers to a range of values within plus or minus 10% of the specified number. And the term "substantially" refers to up to 90% or more of an entirety. The words "about," "approximately," or the like, when accompanying a numerical value, are to be construed as indicating a deviation as would be appreciated by one of ordinary skill in the art to operate satisfactorily for an intended purpose.

Recitation of ranges of values herein are not intended to be limiting, referring instead individually to any and all values falling within the range, unless otherwise indicated, and each separate value within such a range is incorporated into the specification as if it were individually recited herein. Ranges of values and/or numeric values are provided herein as examples only, and do not constitute a limitation on the scope of the described embodiments.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A charging system for generating power for an electrical vehicle in motion, the charging system comprising:
   a parallel arrangement of alternators, each equipped with an electromagnetic clutch;
   an electric storage device of the electrical vehicle; and
   a charge controller electrically coupled between the parallel arrangement of alternators and the electric storage device, wherein the charge controller selectively controls each electromagnetic clutch, wherein the charge controller is configured to selectively control each electromagnetic clutch as a function of a group consisting essentially of a storage capacity of the electric storage device, a set RPM range of the electrical vehicle, or a resistance of each respective alternator;
   an external rectifier between the parallel arrangement of alternators and the charge controller;
   a drive assembly operatively associated with the parallel arrangement of alternators, wherein the drive assembly comprises either an auxiliary motor separate from an electric motor powering the electric vehicle or a parasitic link to an electric motor powering the electric vehicle; and
   an electric motor powering the electric vehicle, wherein the electric storage device is coupled thereto.

* * * * *